United States Patent
Han et al.

(10) Patent No.: US 9,355,766 B2
(45) Date of Patent: May 31, 2016

(54) COIL FOR CORDLESS CHARGING AND CORDLESS CHARGING APPARATUS USING THE SAME

(71) Applicant: SAMSUNG ELECTRO-MECHANICS CO., LTD., Suwon (KR)

(72) Inventors: Chang Mok Han, Suwon (KR); Hyeon Gil Nam, Suwon (KR); Jae Suk Sung, Suwon (KR); Hyung Wook Cho, Suwon (KR); Ki Won Chang, Suwon (KR); Sung Heum Park, Suwon (KR); Sung Eun Cho, Suwon (KR); Dae Seong Jeon, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 362 days.

(21) Appl. No.: 13/793,651

(22) Filed: Mar. 11, 2013

(65) Prior Publication Data

US 2014/0184151 A1    Jul. 3, 2014

(30) Foreign Application Priority Data

Dec. 28, 2012    (KR) ........................ 10-2012-0155770

(51) Int. Cl.
*H02J 7/00*    (2006.01)
*H01F 5/00*    (2006.01)
(Continued)

(52) U.S. Cl.
CPC .. *H01F 5/00* (2013.01); *H01F 5/04* (2013.01); *H01F 27/2804* (2013.01); *H01F 27/29* (2013.01); *H01F 38/14* (2013.01); *H02J 7/025* (2013.01); *H01F 27/2871* (2013.01); *H02J 5/005* (2013.01); *H04B 5/0037* (2013.01); *H04B 5/0081* (2013.01)

(58) Field of Classification Search
CPC ........ H02J 7/025; H01F 38/14; Y02T 90/122; B60L 11/182; Y02E 60/12
USPC ......................................................... 320/108
See application file for complete search history.

(56) References Cited

U.S. PATENT DOCUMENTS 6,501,364 B1    12/2002   Hui et al.
8,339,231 B1 *  12/2012   Joshi .............................. 336/200
(Continued)

FOREIGN PATENT DOCUMENTS

CN    1998128 A      7/2007
CN    101304183 A    11/2008
(Continued)

OTHER PUBLICATIONS

Extended European Search Report mailed Feb. 14, 2014 in corresponding European Application No. 13275055.5.
(Continued)

*Primary Examiner* — Arun Williams
(74) *Attorney, Agent, or Firm* — NSIP Law

(57) ABSTRACT

There are provided a coil for cordless charging, which may be formed as a thin coil in spite of the presence of a plurality of coils included therein, and a cordless charging apparatus using the same. The cordless charging apparatus includes: a coil unit including coil substrates having a coil pattern and a connection substrate having one end interposed between the coil substrates and electrically connected to the coil pattern and the other end electrically connected to the outside; and a case accommodating the coil unit therein.

16 Claims, 9 Drawing Sheets

(51) Int. Cl.
*H01F 38/14* (2006.01)
*H02J 7/02* (2016.01)
*H01F 5/04* (2006.01)
*H01F 27/28* (2006.01)
*H01F 27/29* (2006.01)
*H02J 5/00* (2016.01)
*H04B 5/00* (2006.01)

(56) References Cited

U.S. PATENT DOCUMENTS

| | | |
|---|---|---|
| 2003/0020583 A1 | 1/2003 | Hui et al. |
| 2005/0270745 A1* | 12/2005 | Chen et al. .............. 361/707 |
| 2008/0164840 A1* | 7/2008 | Kato et al. .............. 320/108 |
| 2008/0164844 A1 | 7/2008 | Kato et al. |
| 2011/0056732 A1 | 3/2011 | Uratsuji |
| 2012/0056579 A1* | 3/2012 | Kim et al. .............. 320/108 |
| 2012/0274148 A1 | 11/2012 | Sung et al. |

FOREIGN PATENT DOCUMENTS

| | | |
|---|---|---|
| CN | 101304184 A | 11/2008 |
| CN | 101523693 A | 9/2009 |
| EP | 1 947 660 A2 | 7/2008 |
| EP | 2 518 904 A2 | 10/2012 |
| JP | 2008-172873 | 7/2008 |
| JP | 2008-205215 | 9/2008 |
| JP | 2009-272444 | 11/2009 |
| JP | 2011-187559 | 9/2011 |
| JP | 2012-15178 | 1/2012 |
| KR | 10-2010-0092741 | 8/2010 |
| KR | 10-1179398 | 9/2012 |
| WO | WO 2008/016273 A1 | 2/2008 |

OTHER PUBLICATIONS

Korean Office Action mailed Dec. 18, 2013 in corresponding Korean Application No. 10-2012-0155770.
Chinese Office Action issued on Jun. 19, 2015, in counterpart Chinese Application No. 201310118169.2 (13 pages in English, 10 pages in Chinese).

* cited by examiner

COIL FOR CORDLESS CHARGING AND CORDLESS CHARGING APPARATUS USING THE SAME

CROSS-REFERENCE TO RELATED APPLICATIONS

This application claims the priority of Korean Patent Application No. 10-2012-0155770 filed on Dec. 28, 2012, in the Korean Intellectual Property Office, the disclosure of which is incorporated herein by reference.

BACKGROUND OF THE INVENTION

1. Field of the Invention

The present invention relates to a coil for cordless charging and a cordless charging apparatus using the same, and more particularly, to a coil for cordless charging, which may be formed as a thin coil in spite of the presence of a plurality of coils included therein, and a cordless charging apparatus using the same.

2. Description of the Related Art

In general, portable electronic devices such as mobile communications terminals, personal digital assistants (PDAs), and the like, include a rechargeable secondary battery.

In order to charge a battery of a portable electronic device, a charging apparatus is required to provide electrical energy to the battery by using commercially available household power.

In general, a charging apparatus and a battery have a contact terminal, respectively, and when the two contact terminals thereof are connected, the charging apparatus and the battery are electrically connected.

In this case, however, if the contact terminal is protruded outwardly, an appearance thereof may not be aesthetically pleasing, and the contact terminal may be contaminated by a foreign material to degrade a contact state. Also, when the battery is short-circuited or exposed to moisture due to inadvertent user actions, charged energy may be easily lost.

As an alternative to the contact type charging method, a cordless charging apparatus (or a contactless power transmission apparatus) transmitting power to charge a battery in such a manner that contact terminals of the cordless charging apparatus and the battery are not in contact has been proposed.

In general, a cordless charging apparatus refers to apparatus transmitting power to a contactless power reception apparatus (e.g., a portable device) having a battery, cordlessly.

Such a cordless charging apparatus transmits power by using electromagnetic induction, and to this end, a coil is provided therein.

However, in a related art cordless charging apparatus, connection portions connecting the coil and a driving circuit are formed by soldering. Thus, the related art coil has a thickness disadvantageously increased by as much as a solder ball formed due to soldering.

In line with the recent tendency for ultra-thin electronic devices, an increase in thickness due to a solder ball has emerged as a problem to be tackled and, as a solution, a coil structure for cordless charging is required.

RELATED ART DOCUMENT (Patent document 1) Korean Patent Laid Open Publication No. 2010-0092741

SUMMARY OF THE INVENTION

An aspect of the present invention provides a coil for cordless charging, which has a structure without a solder ball, and a cordless charging apparatus having the same.

Another aspect of the present invention provides a coil for cordless charging, which is formed to be thin in spite of a plurality of coils included therein, and a cordless charging apparatus having the same.

According to an aspect of the present invention, there is provided a coil for cordless charging, including: coil substrates having a coil pattern; and a connection substrate having one end interposed between the coil substrates and electrically connected to the coil pattern and the other end electrically connected to the outside.

The coil pattern may include coil strands formed on both surfaces of the respective coil substrates, and the coil strands may be connected in parallel.

The coil substrates may include first and second coil substrates, and the connection substrate may be interposed between the first and second coil substrates and may be integrally formed with the first and second coil substrates.

The coil substrates may be rigid substrates, and the connection substrate may be a flexible substrate.

The coil pattern may include a plurality of coil strands formed on the coil substrates, and the plurality of coil strands may be uniformly or equally distributed based on the center of the connection substrate.

According to another aspect of the present invention, there is provided a cordless charging apparatus including: a coil unit including coil substrates having a coil pattern and a connection substrate having one end interposed between the coil substrates and electrically connected to the coil pattern and the other end electrically connected to the outside; and a case accommodating the coil unit therein.

The coil pattern may be formed by disposing a plurality of coil strands in line abreast within the coil substrates.

The coil unit may include the coil pattern formed on at least one of both surfaces of the coil substrate, and a contact pad may be formed in both ends of the coil pattern and electrically connected to the connection substrate.

The connection substrate may include a connection pad formed in a position corresponding to the contact pad and electrically connected to the contact pad.

The coil pattern may include coil strands formed to have the same shape on both surfaces of the respective coil substrates.

The coil substrates may have conductive vias formed at positions in which ends of the coil pattern are disposed, and the coil strands formed on both surfaces of the respective coil substrates may be electrically connected by the conductive vias.

The coil substrates may be rigid substrates, and the connection substrate may be a flexible substrate.

The coil pattern may include coil strands formed on both surfaces of the respective coil substrates, and the coil strands may be connected in parallel.

The coil substrates may include first and second coil substrates, and the connection substrate may be interposed between the first and second coil substrates and may be integrally formed with the first and second coil substrates.

The cordless charging apparatus may further include a magnetic unit attached to one surface of the coil unit to form a magnetic path.

The magnetic unit may be formed to have a flat plate-like shape, and may include at least any one of a ferrite sheet, a metal composite sheet, and an amorphous sheet.

The cordless charging apparatus may further include an adhesive unit interposed between the magnetic unit and the coil unit and attaching the magnetic unit and the coil unit.

The cordless charging apparatus may further include a voltage conversion unit converting AC power supplied from the outside into an AC voltage having a particular frequency, and providing the converted AC voltage to the coil unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
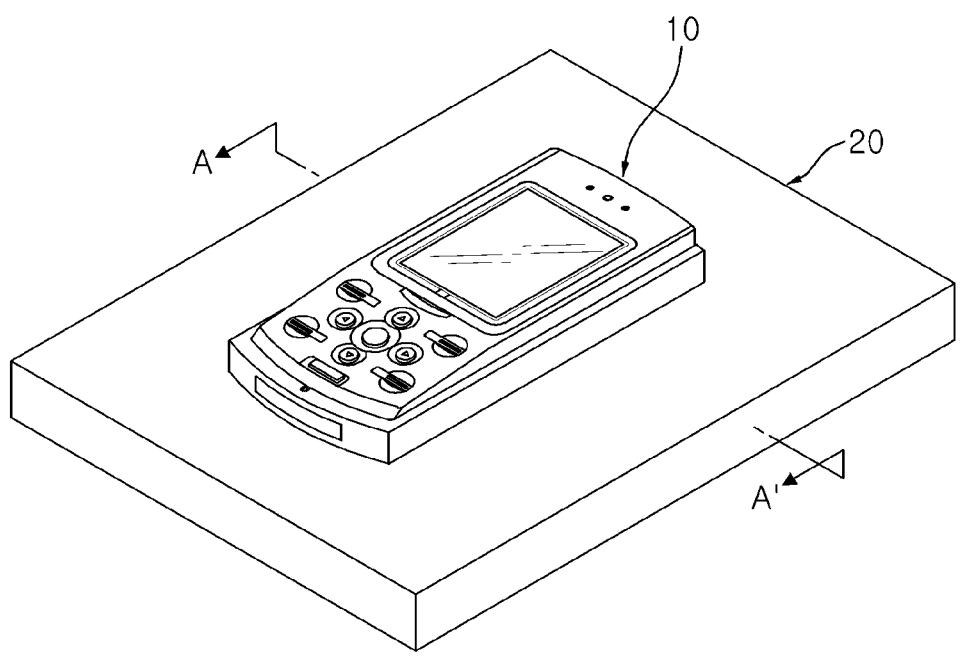
FIG. 1 is a perspective view schematically illustrating an electronic device and a cordless charging apparatus according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

Figure 2:
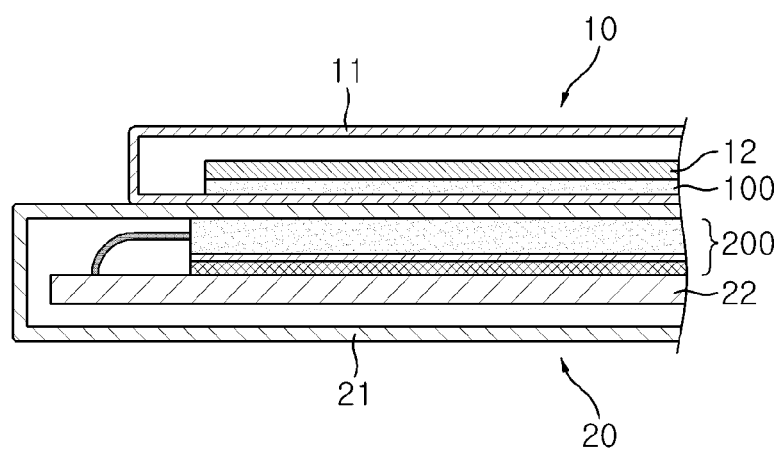
FIG. 2 is a cross-sectional view taken along line A-A' in FIG. 1.

FIG. 1 is a perspective view schematically illustrating an electronic device and a cordless charging apparatus according to an embodiment of the present invention, and FIG. 2 is a cross-sectional view taken along line A-A' in FIG. 1.

Referring to FIGS. 1 and 2, an electronic device 10 according to an embodiment of the present invention may include a battery 12 and a contactless power reception apparatus 100 supplying power to the battery 12 to charge the battery 12.

The battery 12 may be a secondary battery that may be charged and discharged, and may be configured to be detachably attached to the electronic device 10.

The contactless power reception apparatus 100 may be accommodated in a case 11 of the electronic device 10 and may be directly attached to an inner surface of the case 11 or may be disposed as adjacently as possible thereto.

A cordless charging apparatus 20 according to an embodiment of the present invention is provided to charge the battery 12 of the electronic device 10. To this end, the cordless charging apparatus 20 may have a contactless power transmission apparatus 200 provided in a case 21 thereof.

The cordless charging apparatus 20 may convert commercially available household AC power supplied from the outside into DC power, convert the DC power into an AC voltage having a particular frequency, and provide the same to the contactless power transmission apparatus 200. To this end, the cordless charging apparatus 20 may include a voltage conversion unit 22 converting commercially available household AC power into an AC voltage having a particular frequency.

When the AC voltage is applied to a coil of the contactless power transmission apparatus 200, a magnetic field in the vicinity of the coil is changed. Then, according to the change in the magnetic field, a voltage is applied to the contactless power reception apparatus 100 of the electronic device 10 disposed to be adjacent to the contactless power transmission apparatus 200, and thus, the battery 12 is charged.

Hereinafter, the contactless power transmission apparatus 200 provided in the cordless charging apparatus 20 will be described in detail.

Figure 3:
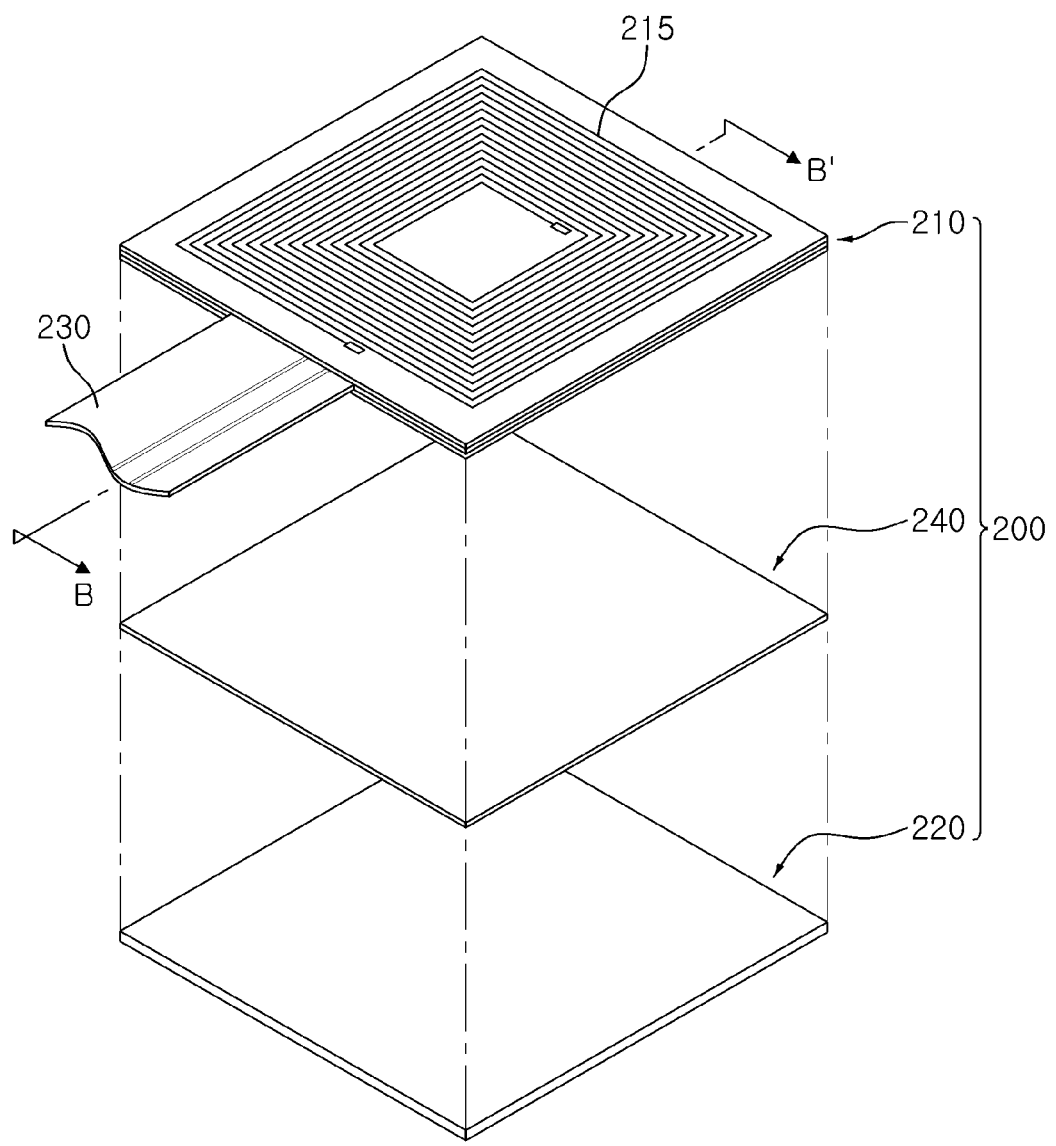
FIG. 3 is an exploded perspective view schematically illustrating a contactless power transmission apparatus according to an embodiment of the present invention.
Figure 4:
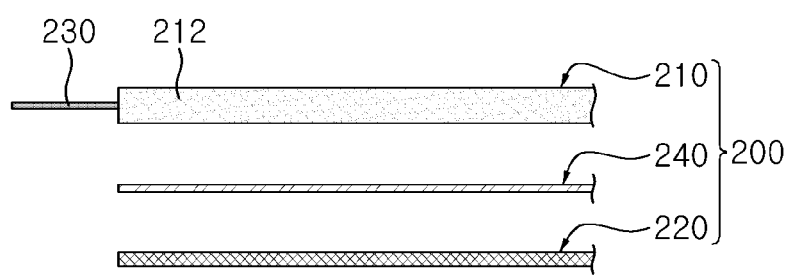
FIG. 4 is a side view of the contactless power transmission apparatus of FIG. 3.
Figure 5:
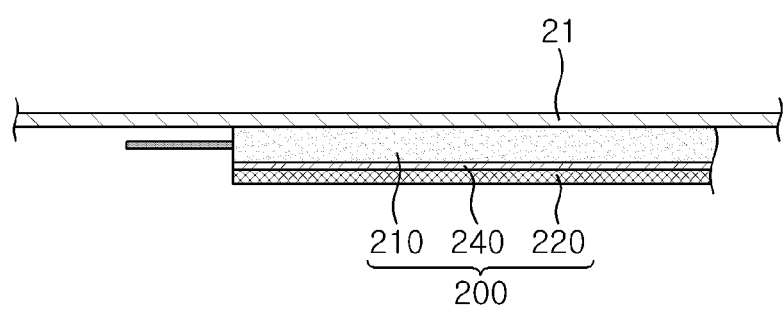
FIG. 5 is a side view of the contactless power transmission apparatus of FIG. 4 in an assembled state.
Figure 6:
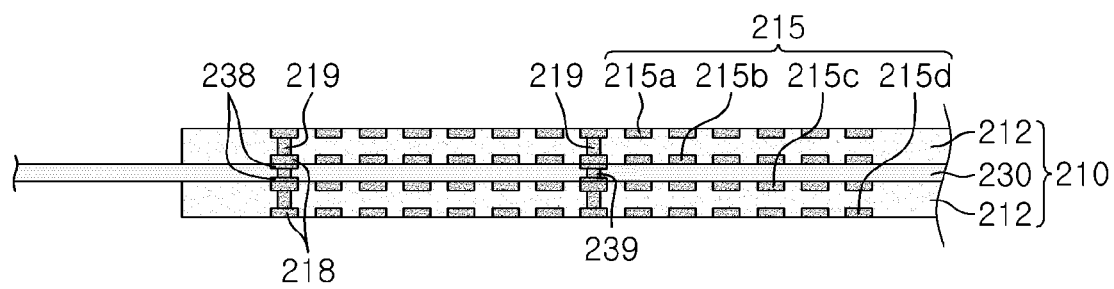
FIG. 6 is a cross-sectional view of a coil unit illustrated in FIG. 3, taken along line B-B'.
Figure 7:
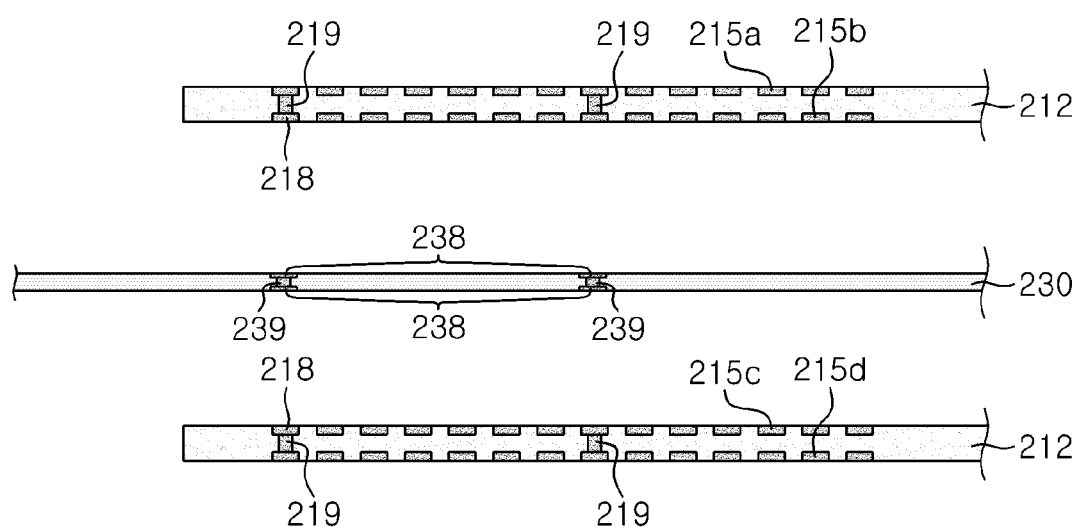
FIG. 7 is a sectional view of the coil unit of FIG. 6 in a disassembled state.
Figure 8:
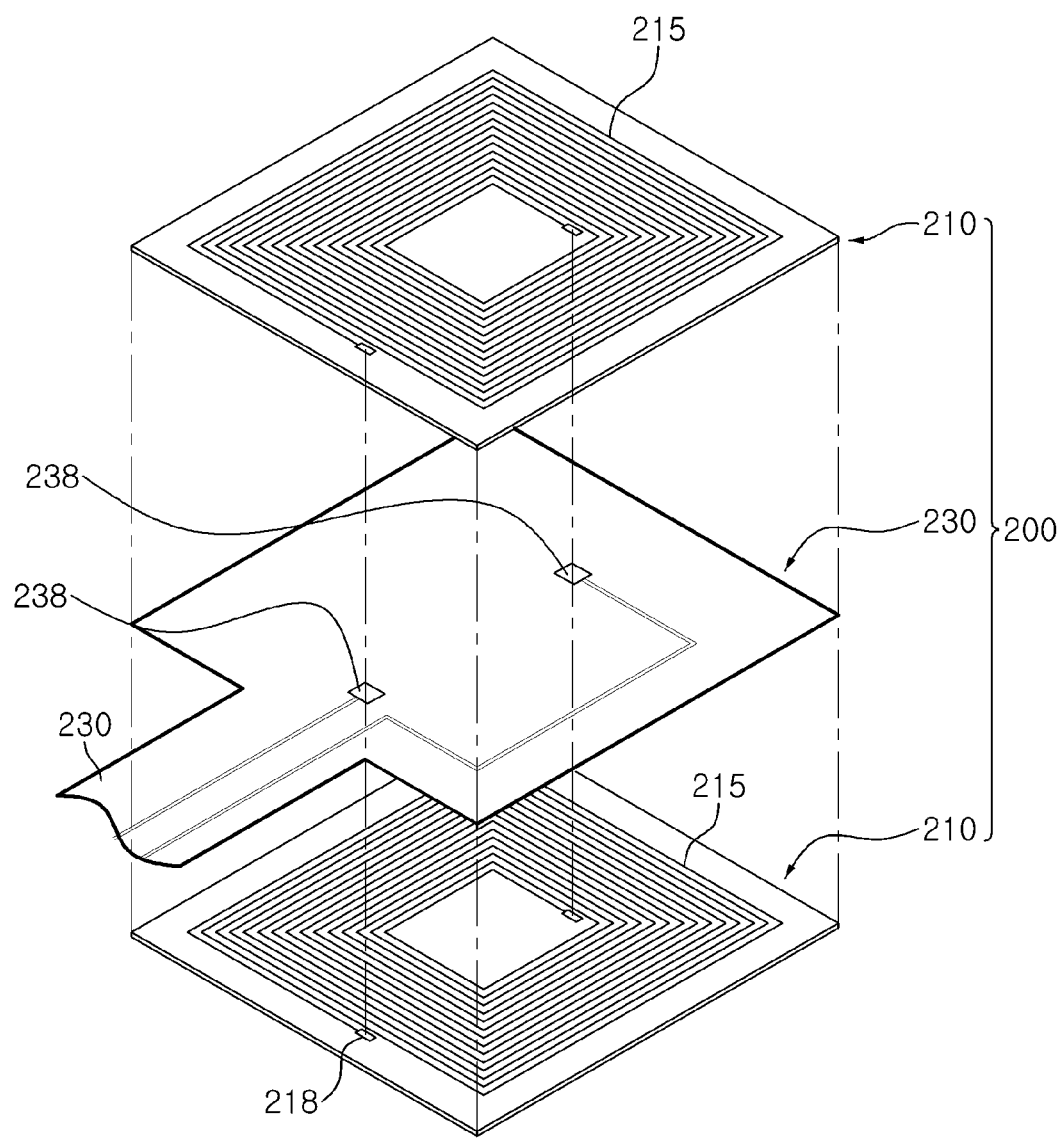
FIG. 8 is an exploded perspective view of the coil unit illustrated in FIG. 3.

FIG. 3 is an exploded perspective view schematically illustrating a contactless power transmission apparatus according to an embodiment of the present invention. FIG. 4 is a side view of the contactless power transmission apparatus of FIG. 3. FIG. 5 is a side view of the contactless power transmission apparatus of FIG. 4 in an assembled state. FIG. 6 is a cross-sectional view of a coil unit illustrated in FIG. 3, taken along line B-B'. FIG. 7 is a sectional view of the coil unit of FIG. 6 in a disassembled state; FIG. 8 is an exploded perspective view of the coil unit illustrated in FIG. 3.

Referring to FIGS. 3 through 8, the contactless power transmission apparatus 200 may include a coil unit 210 and a magnetic unit 220.

The magnetic unit 220, having a flat plate-like shape (or a sheet-like shape), may be disposed on one surface of the coil unit 210 and fixedly attached to the coil unit 210. The magnetic unit 220 is provided to effectively form a magnetic path of a magnetic field generated by a coil pattern 215. To this end, the magnetic unit 220 may be made of a material allowing a magnetic path to be easily formed. In detail, a shielding sheet having magnetic permeability, such as a ferrite sheet, a metal composite sheet, an amorphous sheet, or the like, may be used.

However, the magnetic unit 220 is not limited to the foregoing configuration and may be variously modified; ferrite powder or a magnetic substance solution may be applied to one surface of the coil unit 210, or the like.

Also, the magnetic unit 220 according to the present embodiment may be used as a shielding sheet for shielding electromagnetic waves or leakage flux on an outer surface thereof. In this case, a shielding sheet having magnetic permeability, such as a metal composite sheet, an amorphous sheet, or the like, may be used as the magnetic unit 220. However, the present invention is not limited thereto.

Also, various applications may be implemented. Namely, rather than using the magnetic unit 220 as a shielding sheet, a separate shielding sheet may be added to an outer surface of the magnetic unit 220, or the magnetic unit 220 may be formed by using a plurality of sheets, rather than a single sheet. Namely, a ferrite sheet and a shielding sheet may be laminated to form the magnetic unit 220.

Also, in the contactless power transmission apparatus 200, in order to firmly attach the coil unit 210 and the magnetic unit 220, an adhesive unit 240 may be interposed therebetween.

The adhesive unit 240 may be disposed between the coil unit 210 and the magnetic unit 220 to bind or glue them together. The adhesive unit 240 may be formed as an adhesive sheet or an adhesive tape. Alternatively, the adhesive unit 240 may be configured to contain ferrite powder. Namely, the adhesive unit 240 may be configured to have magnetism together with the magnetic unit 220.

The coil unit 210 may include at least one coil substrate 212 and a connection substrate 230.

The coil substrate 212 according to the present embodiment is an insulating substrate having rigidity. For example, the coil substrate 212 may be a printed circuit board (PCB), a ceramic substrate, a pre-molded substrate, a direct bonded copper (DBC) substrate, or an insulated metal substrate (IMS).

However, the present invention is not limited thereto and a flexible PCB which is thin and has a wiring pattern, such as a film, a thin PCB, or the like, may also be used as necessary.

As illustrated in FIGS. 6 through 8, the coil unit 210 according to the present embodiment may include two coil substrates (hereinafter, referred to as 'a first coil substrate' and 'a second coil substrate') and a single connection substrate 230. However, the present invention is not limited thereto and the coil unit 210 may be variously modified as necessary; for example, the coil unit 210 may include three or more coil substrates.

The coil pattern 215 may be a wiring pattern formed on at least one surface of the coil substrate 212. The coil pattern 215 according to the present embodiment may be formed on both surfaces of the coil substrate 212 and have a vortex shape (or an eddy shape), and contact pads 218 may be formed on both ends of the coil pattern 215 in order to electrically connect the coil pattern 215 to a via 219 or the connection substrate 230.

Both ends of respective coil strands 215a and 215b formed on both surfaces of the coil pattern 215 may be electrically connected to form a parallel circuit as a whole. To this end, the conductive vias 219 may be formed on portions in which both ends of the coil strands 215a and 215b are disposed, in order to electrically connect the coil strands 215a and 215b on both surfaces of the coil substrate 212.

Also, the contact pad 218 may be formed on one end of the via 219 and electrically connected to the outside.

Meanwhile, in the present embodiment, for example, the coil pattern 215 has a quadrangular vortex shape on the whole, but the present invention is not limited thereto and the coil pattern 215 may be variously modified; for example, it may have a circular vortex shape or a polygonal vortex shape.

Also, an insulating protective layer (e.g., a resin insulating layer, not shown) for protecting the coil pattern 215 against the outside may be formed on an upper portion of the coil pattern 215 as necessary.

The coil unit 210 may include the connection substrate 230 electrically connecting the voltage conversion unit (22 in FIG. 1) applying power to the coil pattern 215 of the coil substrates 212.

The connection substrate 230 may be formed as a thin film circuit board (e.g., a flexible board) with a wiring pattern formed therein.

The connection substrate 230 may be electrically connected to voltage conversion unit 22 of the cordless charging apparatus 20, and may have connection pads 238 electrically connected to the contact pads 218 in portions in which the contact pads 238 face the contact pads 218, and vias 239 connecting them.

In particular, in the coil unit 210, the coil substrates 212 may be disposed on both surfaces of the connection substrate 230 and integrally connected to the connection substrate 230.

The coil substrates 212 and the connection substrate 230 may be integrally fabricated during a fabrication process. Namely, during a process of fabricating the coil substrates 212, the connection substrate 230 may be laminated to be interposed between the coil substrates 212. However, the present invention is not limited thereto and the coil substrates 212 and the connection substrate 230 may be separately fabricated and may be integrally attached through a method such as bonding, compressing, or the like.

Meanwhile, in the coil pattern 215 according to the present embodiment, since two coil substrates 212 are formed on both surfaces of the connection substrate 230, a total of four coil strands 215a to 215d may be formed. Both ends of the four respective coil strands 215a to 215d are electrically connected to each other by the vias 219 and the connection substrate 230. Namely, the four coil strands 215a to 215d may be connected in parallel to form a single coil pattern 215.

The contactless power transmission apparatus according to the present embodiment has a hybrid substrate structure in which the connection substrate 230 is interposed between the coil substrates 212 and integrally formed, and the coil is electrically connected to the outside through the connection substrate 230.

Thus, since an electric wire is not bonded to both ends of the coil as it is in the related art, a solder ball due to soldering, or the like, may be omitted. Thus, an increase in a thickness of the coil unit due to a solder ball is prevented, and the coil unit may be maintained to be very thin.

Also, the contactless power transmission apparatus according to the present embodiment can provide efficiency higher than that of the case in which substrates are connected by solder balls.

Figure 9:
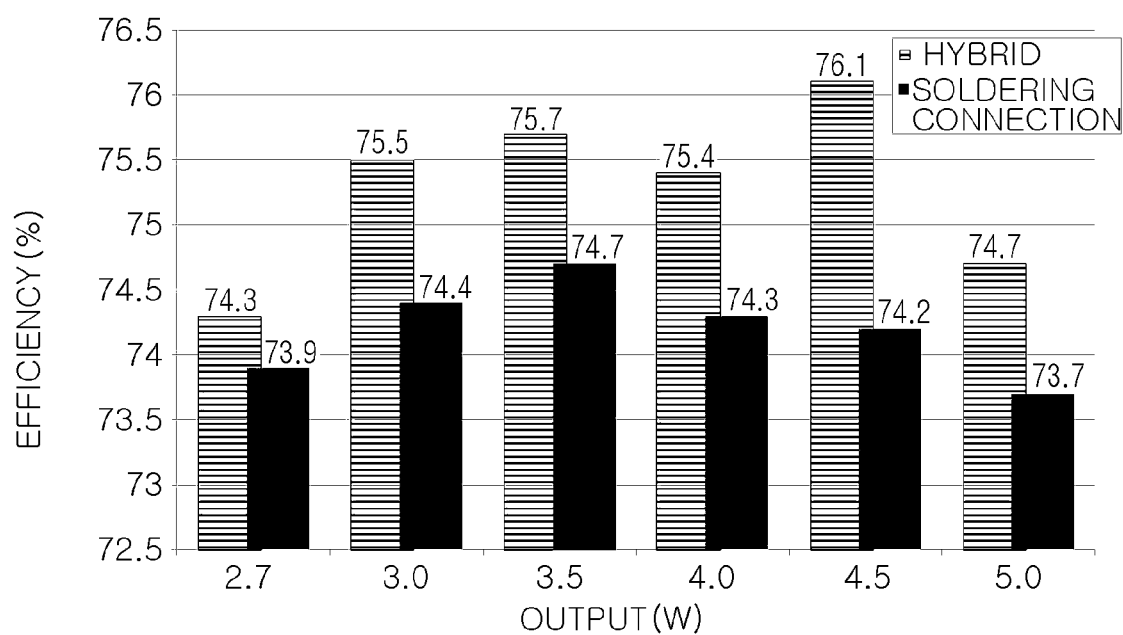
FIG. 9 is a graph showing efficiency of the coil unit according to an embodiment of the present invention.

FIG. 9 is a graph showing efficiency of the coil unit according to an embodiment of the present invention, in which efficiency of the coil unit (hybrid type) according to the foregoing embodiment and that of the structure (connection through soldering) connecting a rigid substrate and a flexible substrate in a soldering manner are shown.

Here, an output (W) indicates a final output of a portable device as a reception (Rx) end, and efficiency indicates a ratio of an output of the portable device as a reception end to an input of the cordless charging apparatus.

Referring to FIG. 9, it can be seen that, when the coil unit is formed as a hybrid type coil unit, efficiency higher than that of the case of the soldering type connection is obtained within the entire power range. Namely, since resistance due to a solder ball is omitted, the coil unit has enhanced overall efficiency.

Also, in the contactless power transmission apparatus according to the present embodiment, since the connection substrate and the coil substrates are integrally formed, although the connection substrate moves, such a movement is not transmitted to a connection portion between the connection substrate and the coil substrates, whereby high bonding reliability can be secured in comparison to the related art.

In addition, since the process of soldering an electric wire such as in the related art is omitted, a fabrication process and fabrication time can be reduced.

In addition, in the coil unit according to the present embodiment, a single coil pattern is formed by a plurality of coil strands connected in parallel. Thus, although the coil pattern according to the present embodiment is formed as a pattern on the coil substrate, an effect of using a stranded type coil (e.g., a Litz wire) formed by twisting several electric wires can be obtained. The use of such a stranded type coil minimizes a loss (e.g., an AC resistance value, or the like) made due to a skin effect and an eddy current in a low frequency.

In this manner, in the contactless power transmission apparatus, since the coil pattern is formed in a stranded type and a thickness of the coil unit is prevented from being increased due to a solder ball, or the like, an overall thickness of the contactless power transmission apparatus can be reduced.

The configuration of the contactless power transmission apparatus described above may also be applied in the same manner to the contactless power reception apparatus 100 provided in the portable device (10 in FIG. 1). Thus, a detailed description of the contactless power reception apparatus will be omitted.

Meanwhile, in the above embodiment, the case in which only a single coil strand is formed on one surface of the coil substrate is described as an example, but the present invention is not limited thereto.

Namely, in a case in which the coil substrate is formed to have a large size, a plurality of coil strands may be formed on one surface thereof, and in a case in which the coil substrate is formed to have a small size, only a single coil may be formed on one surface thereof, as in the present embodiment.

Also, in the present embodiment, the coil strands formed on the respective surfaces of the coil substrate are formed in positions in which the coil strands are projected on each other (namely, the coil strands are formed in positions in which the coil strands correspond to each other in a vertical direction), but the present invention is not limited thereto. Namely, the coil strands formed on the respective surfaces of the coil substrate may be formed in positions deviating from one another, rather than in positions corresponding to one another. Namely, various modifications may be implemented as necessary.

In addition, in the present embodiment, the coil substrates and the connection substrate are separately fabricated and laminated to form the coil unit, but the present invention is not limited thereto. Namely, various modifications may be implemented. For example, the coil substrate with the coil pattern formed thereon and the connection substrate with the wiring pattern formed thereon are first laminated and vias penetrating both the coil substrate and the connection substrate may be subsequently formed to electrically connect the coil pattern of the coil substrate and the wiring pattern of the connection substrate.

Also, in the foregoing embodiments, the contactless power transmission apparatus employed in a cordless charging apparatus has been described as an example, but the present invention is not limited thereto and may be extensively applied to any electronic device that may be used upon being charged with power and any power transmission device that may transmit power.

As set forth above, according to embodiments of the invention, the coil for cordless charging has a hybrid substrate structure in which the connection substrate is interposed between the coil substrates and integrally formed, and the coil is electrically connected to the outside through the connection substrate.

Thus, since an electric wire is not bonded to both ends of the coil as it is in the related art, a solder ball due to soldering, or the like, may be omitted. Thus, an increase in a thickness of the coil for cordless charging due to a solder ball, or the like, can be prevented, and the cordless charging apparatus may be maintained to be very thin.

Also, since the connection substrate and the coil substrates are integrally formed, although the connection substrate moves, such a movement is not transmitted to a connection portion between the connection substrate and the coil substrates, whereby high bonding reliability can be secured in comparison to the related art.

In addition, since the process of soldering an electric wire such as in the related art is omitted, a fabrication process and fabrication time can be reduced.

In addition, in the coil for cordless charging according to the present embodiment, a single coil pattern is formed by a plurality of coil strands connected in parallel. Thus, although the coil pattern according to the present embodiment is formed as a pattern on the coil substrate, an effect of using a stranded type coil (e.g., a Litz wire) formed by twisting several electric wires can be obtained. The use of such a stranded type coil minimizes a loss (e.g., an AC resistance value, or the like) made due to a skin effect and an eddy current in a low frequency.

While the present invention has been shown and described in connection with the embodiments, it will be apparent to those skilled in the art that modifications and variations can be made without departing from the spirit and scope of the invention as defined by the appended claims.

What is claimed is:

1. A coil for cordless charging, the coil comprising:
first and second coil substrates having a coil pattern; and
a connection substrate having one end interposed between the first and second coil substrates and electrically connected to the coil pattern and the other end electrically connected to the outside,
wherein each of the first coil substrate and the second coil substrate is printed on a printed circuit board having rigidity, and the connection substrate is a thin film circuit board having flexibility.

2. The coil of claim 1, wherein the coil pattern comprises coil strands formed on both surfaces of the respective coil substrates, and the coil strands are connected in parallel.

3. The coil of claim 1, wherein the coil pattern comprises a plurality of coil strands formed on the coil substrates, and the plurality of coil strands are uniformly or equally distributed based on the center of the connection substrate.

4. The coil of claim 1, wherein the connection substrate does not have a coil pattern.

5. A cordless charging apparatus comprising:
a coil unit comprising first and second coil substrates having a coil pattern and a connection substrate having one end interposed between the first and second coil substrates and electrically connected to the coil pattern and the other end electrically connected to the outside; and
a case accommodating the coil unit therein,
wherein each of the first coil substrate and the second coil substrate is printed on a printed circuit board having rigidity, and the connection substrate is a thin film circuit board having flexibility.

6. The cordless charging apparatus of claim 5, wherein the coil pattern is formed by disposing a plurality of coil strands in line abreast within the coil substrates.

7. The cordless charging apparatus of claim 5, wherein the coil unit comprises the coil pattern formed on at least one of both surfaces of the coil substrate, and a contact pad is formed at both ends of the coil pattern and electrically connected to the connection substrate.

8. The cordless charging apparatus of claim 7, wherein the connection substrate comprises a connection pad formed in a position corresponding to the contact pad and electrically connected to the contact pad.

9. The cordless charging apparatus of claim 5, wherein the coil pattern comprises coil strands formed to have the same shape on both surfaces of the respective coil substrates.

10. The cordless charging apparatus of claim 9, wherein the coil substrates comprise conductive vias formed at positions at which ends of the coil pattern are disposed, and the coil strands formed on both surfaces of the respective coil substrates are electrically connected by the conductive vias.

11. The cordless charging apparatus of claim 5, wherein the coil pattern comprises coil strands formed on both surfaces of the respective coil substrates, and the coil strands are connected in parallel.

12. The cordless charging apparatus of claim 5, further comprising a magnetic unit attached to one surface of the coil unit to form a magnetic path.

13. The cordless charging apparatus of claim 12, wherein the magnetic unit is formed to have a flat plate-like shape, and comprises at least any one of a ferrite sheet, a metal composite sheet, and an amorphous sheet.

14. The cordless charging apparatus of claim 13, further comprising an adhesive unit interposed between the magnetic unit and the coil unit and attaching the magnetic unit and the coil unit.

15. The cordless charging apparatus of claim 5, further comprising a voltage conversion unit converting AC power supplied from the outside to an AC voltage having a particular frequency, and providing the converted AC voltage to the coil unit.

16. The cordless charging apparatus of claim 5, wherein the connection substrate does not have a coil pattern.

* * * * *